United States Patent [19]
Hsueh

[11] Patent Number: 5,294,170
[45] Date of Patent: Mar. 15, 1994

[54] MULTI-PURPOSE AUTOMOBILE REAR SPOILER ASSEMBLY

[76] Inventor: Chin-Yung Hsueh, 430, Ping Ho Road, Sec. 1, Nan Chen Village, Tien Wei Hsiang, Changhua, Taiwan

[21] Appl. No.: 10,694

[22] Filed: Jan. 29, 1993

[51] Int. Cl.$^5$ ............................................. B60J 11/00
[52] U.S. Cl. ................................. 296/180.1; 296/136
[58] Field of Search ...................... 296/136, 180.1, 91

[56] References Cited

U.S. PATENT DOCUMENTS

| | | | |
|---|---|---|---|
| 4,727,898 | 3/1988 | Guma | 296/136 X |
| 4,819,132 | 4/1989 | Hwan et al. | 296/180.1 X |
| 4,958,881 | 9/1990 | Piros | 296/136 X |
| 4,966,406 | 10/1990 | Karasik et al. | 296/136 X |

*Primary Examiner*—Robert R. Song
*Attorney, Agent, or Firm*—Lowe, Price, LeBlanc & Becker

[57] ABSTRACT

A multi-purpose automobile rear spoiler assembly includes a reversing sunshade roller fastened inside a rear spoiler mounted on the tail of an automobile, and two automatic return straps are provided with anchoring claw hooks for securing the reversing sunshade roller in an operative position. The reversing sunshade has an air bag at the bottom to shield the automobile from the radiant heat of the sun, and two side panels secured by the automatic return straps with anchoring claw hooks to cover the door windows of the automobile as the sunshade of the sunshade roller is pulled out of the rear spoiler and disposed operatively over the top of the car.

12 Claims, 4 Drawing Sheets

MULTI-PURPOSE AUTOMOBILE REAR SPOILER ASSEMBLY

BACKGROUND OF THE INVENTION

1. Field of the Invention

The present invention relates to motor vehicle rear spoilers, and more particularly to a multi-purpose automobile rear spoiler assembly which combines a rear spoiler, a sun screen and a signal lamp assembly together.

2. Description of Prior Art

A variety of accessories and devices including a remote-control burglar alarm system, sun shade, accelerator, spoiler, third stop lamp, etc., may be added to a car so as to improve its performance or make it more versatile. A third stop lamp is typically for giving a signal to the people behind the car upon a brake. If a rear spoiler is installed in the tail of a car to break up airflow around the car body, the third stop lamp of the car may become less visible. Further, the coating of a car may be caused to fade and crack when the car is often parked in places under direct sunlight. When a car is being parked in a place under direct sunlight, the internal space of the car will become hot within a short time.

SUMMARY OF THE INVENTION

According to one aspect of the present invention, the multi-purpose automobile rear spoiler assembly comprises a reversing sunshade roller coupled to a rear spoiler mounted on the tail of a car. The sunshade of the sunshade roller has an air bag at the bottom, which is inflated to isolate the sunshade from the top of the car as the sunshade is pulled out of the spoiler through an elongated slot thereof and secured in position covering over the top of the car.

According to another aspect of the present invention, the sunshade comprises two side panels, which covers the door windows of the car as the sunshade cover the top of the car.

According to still another aspect of the present invention, the rear spoiler comprises two automatic return straps with anchoring claw hooks for securing the side panels of the sunshade of the sunshade roller in an operative condition.

According to still another aspect of an present invention, the car has three cross-bars spaced on the top to protect direct contact of the sunshade of the sunshade roller against the top surface of the car.

According to still another aspect of the present invention, the rear spoiler comprises a signal lamp assembly on a vertical side wall thereof, which signal lamp assembly consists of two direction indicator control lamps, two backing lamps, and a third stop lamp.

BRIEF DESCRIPTION OF THE DRAWINGS

The foregoing and other objects, features and advantages of the present invention will be best understood from the following description, the appended claims and the accompanying drawings in which:

DETAILED DESCRIPTION OF THE PREFERRED EMBODIMENT

Figure 1:
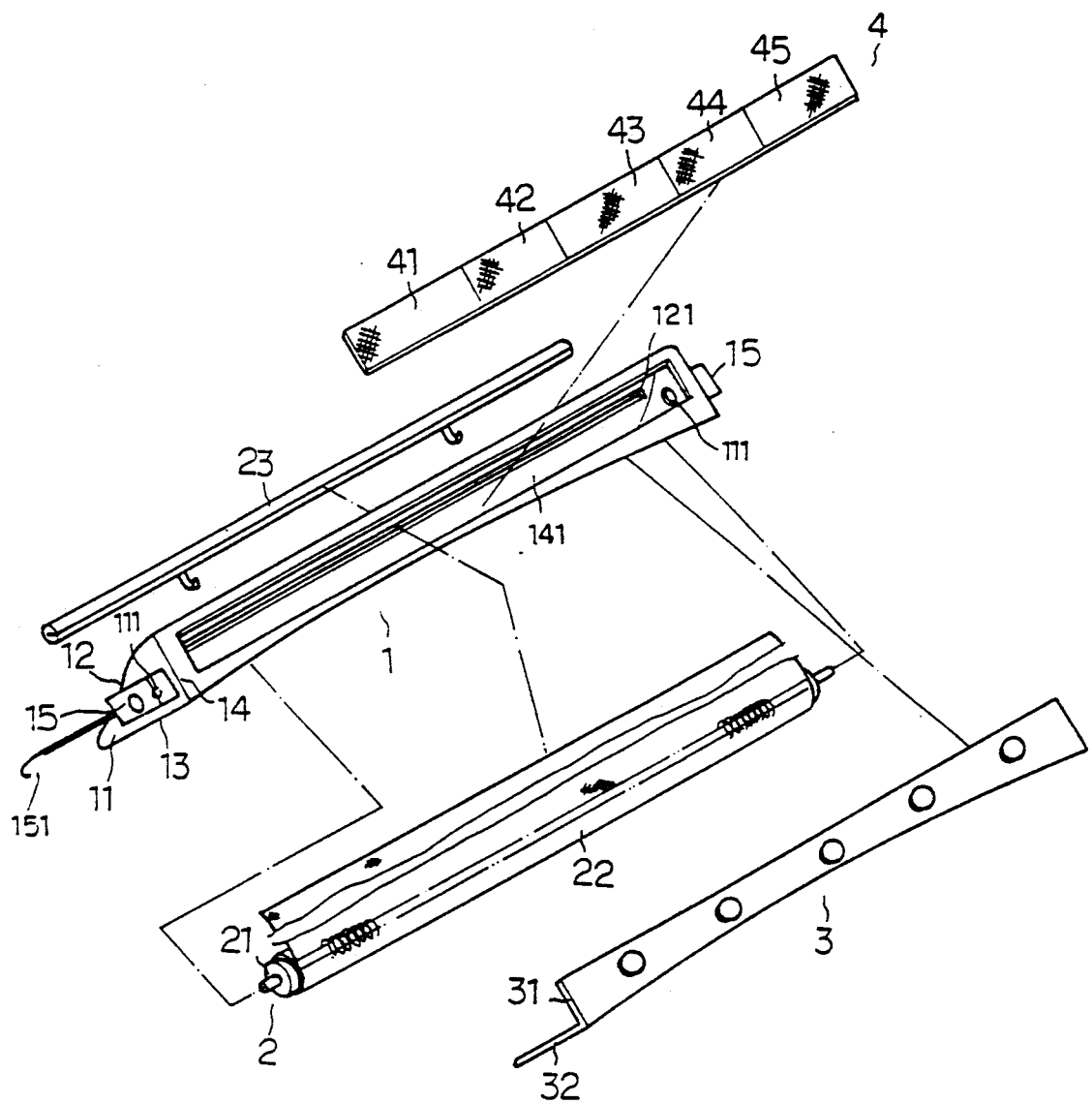
FIG. 1 is an exploded view of a multi-purpose automobile rear spoiler assembly embodying the present invention.
Figure 2:
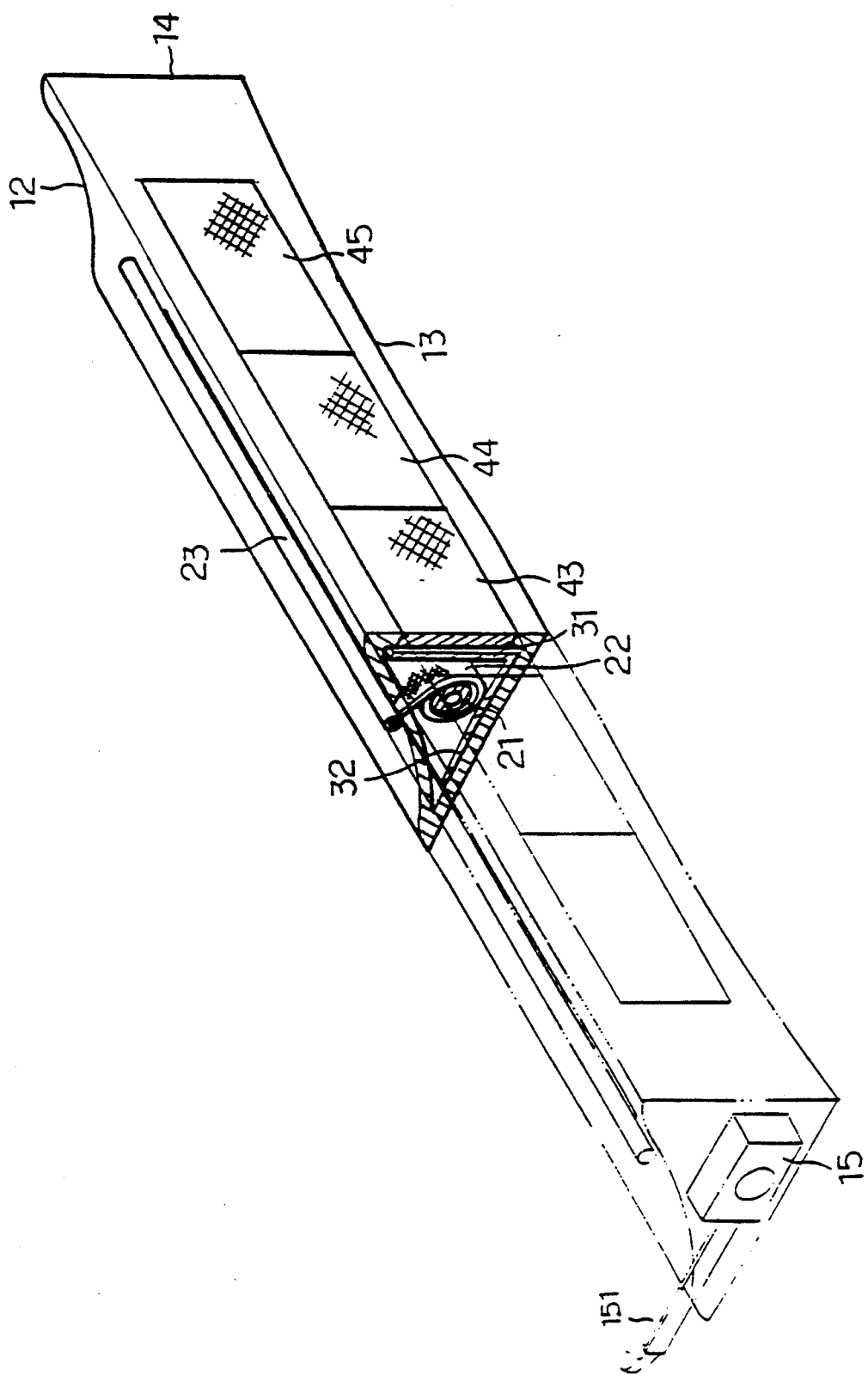
FIG. 2 is a perspective sectional view thereof.
Figure 4:
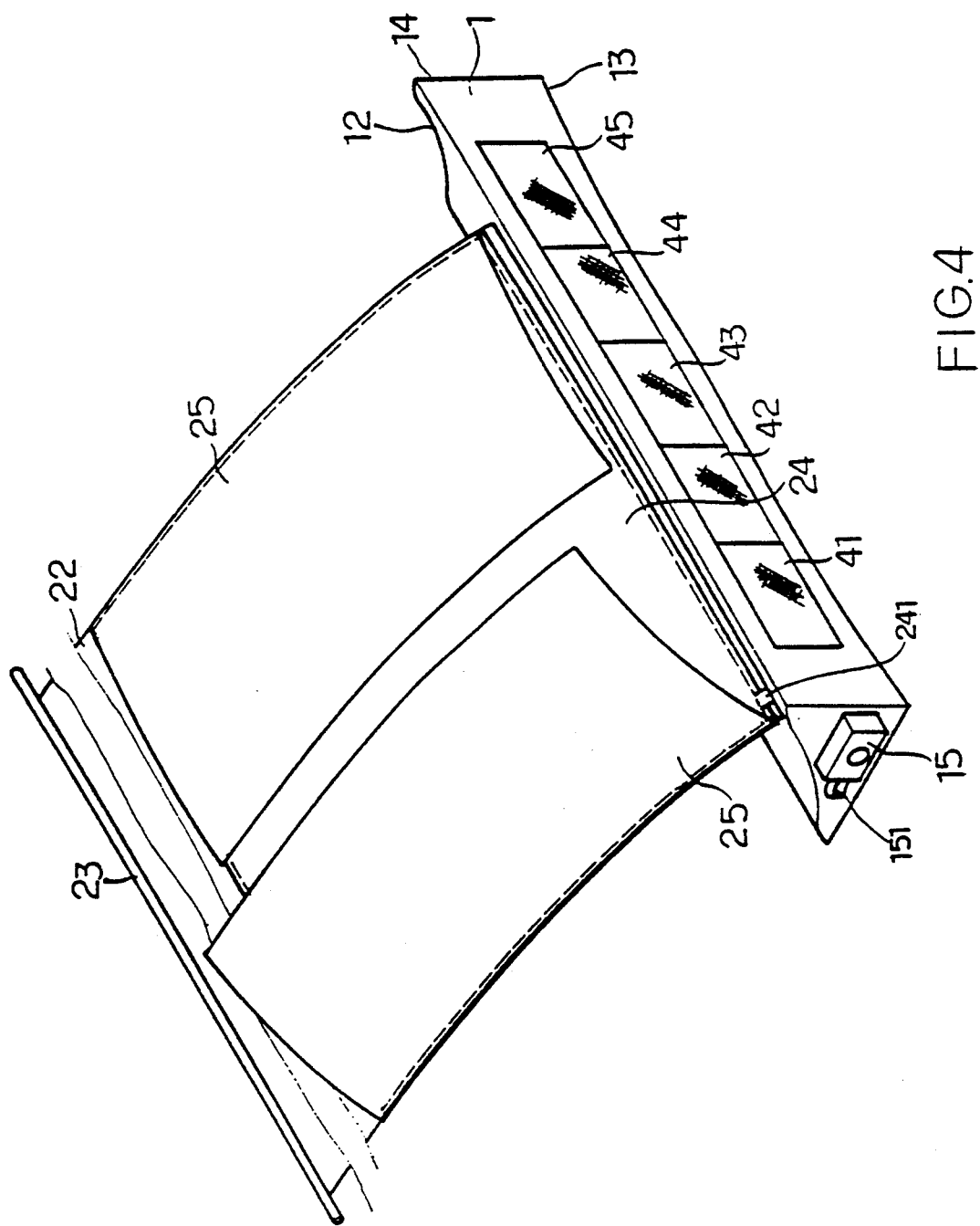
FIG. 4 illustrates the sunshade pulled out of the spoiler.

Referring to FIGS. 1, 2 and 4, a multi-purpose rear spoiler assembly in accordance with the present invention is generally comprised of a spoiler 1, a sunshade roller 2, a lamp holder 3, and a signal lamp assembly 4. The spoiler 1 is preferably made from a hollow, triangular block 11 having a sloping top wall 12 smoothly curved outwards, a generally flat bottom wall 13, a vertical side wall 14 perpendicular to the flat bottom wall 13, an elongated slot 121 on the sloping top wall 12 in longitudinal direction, a rectangular opening 141 on the vertical side wall 14, two opposite round holes 111 and hook holders 15 on two opposite ends thereof. Each hook holder 15 comprises an automatic return strap with anchoring claw hook 151. The sunshade roller 2 is comprised of a spring-controlled reversing roller 21, and a sunshade 22. The sunshade 22 has one end coupled to the spring-controlled reversing roller 21 and an opposite end coupled with a slat 23. The spring-controlled reversing roller 21 has two opposite ends respectively inserted into the two opposite round holes 111 on the spoiler 1. The sunshade 22 is inserted through the elongated slot 121 with the slat 23 stopped outside the spoiler 1. The sunshade 22 further comprises two opposite side panels 25 at two opposite sides for covering the door windows C2 of the car C (see FIG. 5), and an air bag 24 at the bottom.

The lamp holder 3 is made from an angle frame, having a horizontal wall 32 fastened to the flat bottom wall 13 of the spoiler 1, and a vertical wall 31 covered over the rectangular opening 141 to hold the five lamp bulbs of the signal lamp assembly 4. The control circuit of the lamp holder 3 is connected to the warning system of the car to which the multi-purpose rear spoiler assembly is mounted. The signal lamp assembly 4 is mounted on the vertical side wall 14 of the spoiler 1 and covered over the vertical wall 31 of the lamp holder 3, and comprised of direction indicator control lamps 41,45, backing lamps 42,44, and a stop lamp 43.

Figure 3:
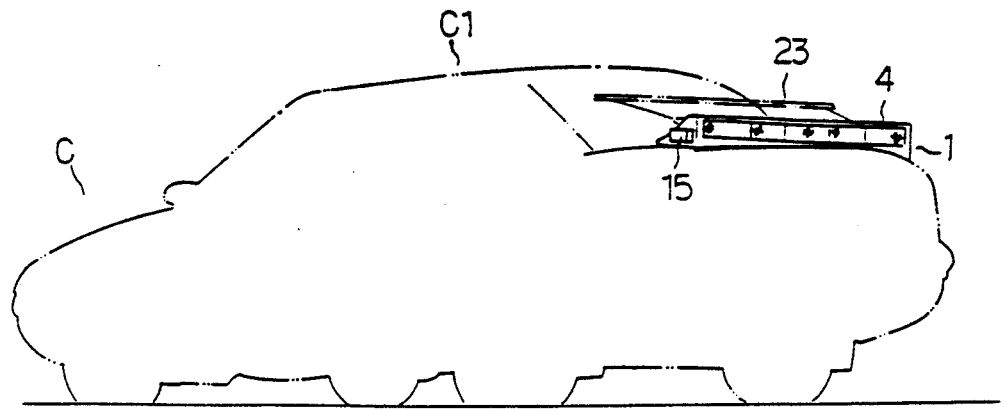
FIG. 3 is an installed view showing the multi-purpose automobile rear spoiler assembly mounted on the tail of a car.
Figure 5:
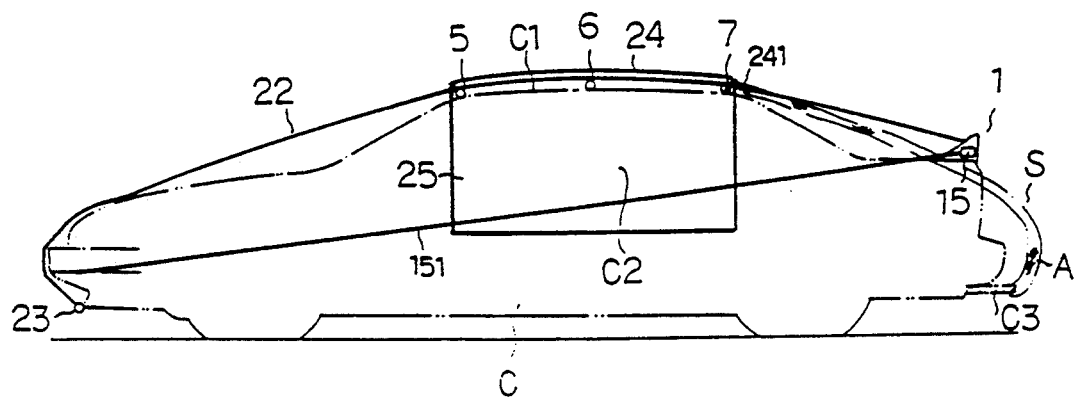
FIG. 5 illustrates the sunshade covered over the body of the car and the air bag being inflated by exhaust gas of the car.

Referring to FIGS. 3 and 5, the slat 23 is pulled from the spoiler and hooked on the front bumper of the car C for permitting the sunshade 22 to be covered over the roof C1 of the car C. There are provided three cross-bars 5,6,7 on the top of the roof C1 to prevent direct contact of the sunshade 22 against the top surface of the roof C1. When installed, a hose S is connected between the exhaust pipe C3 of the car and an air valve 241 on the air bag 24 for guiding exhausted gas A of the car C in inflating the air bag 24. The side panels 25 of the sunshade 22 are then put down to cover the car door windows C2 of the car C and are respectively retained in place by the automatic return strap with anchoring claw hook 151 of either hook holder 15. Because the sunshade 22 is isolated from the body of the car C by the air bag 24, less radiant heat from the sun is allowed to act on the body of the car C.

In this disclosure, there are shown and described only the preferred embodiments of the invention, but, as aforementioned, it is to be understood that the invention is capable of use in various other combinations and environments and is capable of changes or modifications within the scope of the inventive concept as expressed herein.

What is claimed is:

1. A multi-purpose automobile rear spoiler assembly, comprising:

a rear spoiler mounted on the tail of an automobile to hold a signal lamp assembly, wherein said rear spoiler comprises an inside chamber to hold a reversing sunshade roller and two automatic return straps with anchoring claw hooks for securing said reversing sunshade roller in an operative position, said reversing sunshade roller comprising a sunshade having one end coupled to a reversing roller inside said inside chamber and an opposite end inserted through an elongated slot on said spoiler and coupled with a slat stopped outside said elongated slot;

an air bag connected to said sunshade at the bottom;

two side panels bilaterally connected to said sunshade and extended out for covering over the door windows of said car; and means for inflating the air bag.

2. The multi-purpose automobile rear spoiler assembly according to claim 1, wherein:

said automobile has a top and a plurality of cross-bars spaced thereon to prohibit direct contact of said sunshade against the top.

3. A multi-purpose automobile rear spoiler assembly, comprising:

a rear spoiler mounted on the tail of an automobile to hold a signal lamp assembly, wherein said rear spoiler comprises an inside chamber to hold a reversing sunshade roller and two automatic return straps with anchoring claw hooks for securing said reversing sunshade roller in an operative position, said reversing sunshade roller comprising a sunshade having one end coupled to a reversing roller inside said inside chamber and an opposite end inserted through an elongated slot on said spoiler and coupled with a slat stopped outside said elongated slot;

an air bag connected to said sunshade at the bottom;

two side panels bilaterally connected to said sunshade and extended out for covering over the door windows of said car; and means for inflating the air bag, wherein said air bag is inflated to isolate said sunshade from the top as said sunshade is disposed over the top, and said side panels are disposed to cover the door windows and are secured in place by said automatic return straps with anchoring claw hooks as said sunshade is arranged in said operative position.

4. The multi-purpose automobile rear spoiler assembly according to claim 1, wherein:

said means for inflating the air bag comprises means for communicating the air bag to an exhaust of the automobile to receive gases therefrom for inflation of the air-bag.

5. The multi-purpose automobile rear spoiler assembly according to claim 4, wherein:

said means for inflating the air bag comprises valve means for guiding said gases into the air bag to inflate the same.

6. The multi-purpose automobile rear spoiler assembly according to claim 1, further comprising:

said signal lamp assembly comprises at least one of a direction indicator control lamp, a backing lamp, and a stop lamp.

7. The multi-purpose automobile rear spoiler assembly according to claim 6, further comprising:

control circuit means for controlling said lamps, connected to a warning system of the automobile.

8. The multi-purpose automobile rear spoiler assembly according to claim 3, wherein:

said automobile has a top and a plurality of cross-bars spaced thereon to prohibit direct contact of said sunshade against the top.

9. The multi-purpose automobile rear spoiler assembly according to claim 3, wherein:

said means for inflating the air bag comprises means for communicating the air bag to an exhaust of the automobile to receive gases therefrom for inflation of the air-bag.

10. The multi-purpose automobile rear spoiler assembly according to claim 3, wherein:

said means for inflating the air bag comprises valve means for guiding said gases into the air bag to inflate the same.

11. The multi-purpose automobile rear spoiler assembly according to claim 8, wherein:

said means for inflating the air bag comprises means for communicating the air bag to an exhaust of the automobile to receive gases therefrom for inflation of the air-bag; and said means for inflating the air bag comprises valve means for guiding said gases into the air bag to inflate the same.

12. The multi-purpose automobile rear spoiler assembly according to claim 11, wherein:

said signal lamp assembly comprises at least one of a direction indicator control lamp, a backing lamp, and a stop lamp.

* * * * *